United States Patent
Ligata

(10) Patent No.: US 10,006,520 B2
(45) Date of Patent: Jun. 26, 2018

(54) SYSTEM FOR REGULATING STRESSES IN RING GEARS

(71) Applicant: General Electric Company, Schenectady, NY (US)

(72) Inventor: Haris Ligata, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days. days.

(21) Appl. No.: 15/253,564

(22) Filed: Aug. 31, 2016

(65) Prior Publication Data

US 2018/0058545 A1    Mar. 1, 2018

(51) Int. Cl.
 *F16H 1/28* (2006.01)
 *F16H 57/04* (2010.01)
 *F02C 7/36* (2006.01)

(52) U.S. Cl.
 CPC ....... *F16H 1/2818* (2013.01); *F16H 57/0471* (2013.01); *F02C 7/36* (2013.01); *F05D 2260/40311* (2013.01)

(58) Field of Classification Search
 None
 See application file for complete search history.

(56) References Cited

U.S. PATENT DOCUMENTS

| | | | |
|---|---|---|---|
| 4,096,769 A * | 6/1978 | Horikiri | F16H 1/2818 475/347 |
| 5,391,125 A * | 2/1995 | Turra | F16H 1/2836 475/331 |
| 5,433,674 A | 7/1995 | Sheridan et al. | |
| 5,974,911 A | 11/1999 | Pias et al. | |
| 7,011,599 B2 | 3/2006 | Becquerelle et al. | |
| 8,585,539 B2 | 11/2013 | Sheridan et al. | |
| 8,708,863 B2 * | 4/2014 | McCune | F01D 5/027 475/159 |
| 8,968,148 B2 * | 3/2015 | Matsuoka | F16H 1/2818 475/331 |
| 8,986,160 B2 | 3/2015 | Altamura et al. | |
| 9,140,342 B2 | 9/2015 | Hoebel et al. | |

(Continued)

OTHER PUBLICATIONS

Xue et al., "Ring-Planet Mesh Stiffness Study with Different Boundary Conditions and Crack Locations", ASME 2015 Power Transmission and Gearing Conference, vol. No. 10, 9 pages, 2015.

(Continued)

*Primary Examiner* — Justin Holmes
(74) *Attorney, Agent, or Firm* — GE Global Patent Operation; Nitin Joshi

(57) ABSTRACT

A ring gear having a longitudinal axis includes an annular gear rim. The annular gear rim further includes an inner annular surface and a plurality of teeth extending from the inner annular surface, the plurality of teeth configured to mate with a planet gear of a planetary gear assembly. The annular gear rim further includes a plurality of pin members distributed circumferentially about the annular gear rim, each pin member of the plurality of pin members oriented parallel to the longitudinal axis. The plurality of pin members is configured to couple the annular gear rim to a secondary structure and, when coupled to the secondary structure, to facilitate bending of the annular gear rim when a load is applied to at least a portion of the plurality of teeth by the planet gear.

17 Claims, 8 Drawing Sheets

(56) References Cited

U.S. PATENT DOCUMENTS

| | | | | |
|---|---|---|---|---|
| 9,499,260 | B2* | 11/2016 | Christensen | B64C 25/405 |
| 2007/0265133 | A1* | 11/2007 | Smook | F16H 1/48 |
| | | | | 475/317 |
| 2012/0015776 | A1* | 1/2012 | Lemmers, Jr. | F01D 21/006 |
| | | | | 475/271 |
| 2013/0102432 | A1* | 4/2013 | Imai | F16H 57/0409 |
| | | | | 475/159 |
| 2015/0210385 | A1 | 7/2015 | Didey | |

OTHER PUBLICATIONS

Chapron et al,, "Optimization of Profile Modifications with Regard to Dynamic Tooth Loads in Single and Double-Helical Planetary Gears with Flexible Ring-Gears", Journal of Mechanical Design, vol. No. 138, Issue No. 2, 11 pages, Nov. 19, 2015.

* cited by examiner

SYSTEM FOR REGULATING STRESSES IN RING GEARS

BACKGROUND

The field of the disclosure relates generally to systems and methods for regulating loads in planetary gear assemblies and, more particularly, to an apparatus and method for regulating stresses in ring gears of planetary gear assemblies.

Known planetary gear assemblies typically include an outer ring gear, a central or sun gear, and a plurality of planet gears disposed between the outer ring gear and the central gear and configured to engage both the ring gear and the central gear. During operation, a drive applies a rotational force to at least one of the ring gear, the plurality of planet gears, and the central gear, thereby inducing rotation of one or more of the other planetary gear assembly gears. To induce rotation, force is transferred via the teeth of a first gear to the complementary teeth of a second gear. The application of this force generally induces stresses within both the first and second gear. Such stresses can lead to fatigue and failure of the gears, particularly in areas prone to high localized stresses including, without limitation, the roots of one or more of the ring gear, the planet gears, and the sun gear, and other structural features of the gears, such as cutouts, holes, rigid couplings, and the like.

BRIEF DESCRIPTION

In one aspect, a ring gear is provided. The ring gear has a longitudinal axis and includes an annular gear rim. The annular gear rim further includes an inner annular surface and a plurality of teeth extending from the inner annular surface and configured to mate with a planet gear of a planetary gear assembly. The annular gear rim also includes a plurality of pin members distributed circumferentially about the annular gear rim. Each pin member of the plurality of pin members is oriented parallel to the longitudinal axis. The plurality of pin members is configured to couple the annular gear rim to a secondary structure. When coupled to a secondary structure, the pin members facilitate bending of the annular gear rim when a load is applied to a portion of the plurality of teeth by the planet gear.

In another aspect, a gear assembly is provided. The gear assembly includes a central gear, a plurality of planet gears coupled to the central gear, and a ring gear coupled to the plurality of planet gears. The ring gear has a longitudinal axis and includes an annular gear rim that further includes an inner annular surface and a plurality of teeth extending from the inner annular. The annular gear rim also includes a plurality of pin members distributed circumferentially about the annular gear rim. The plurality of pin members is configured to couple the annular gear rim to a secondary structure. The pin members further facilitate bending of the annular gear rim when a load is applied to a portion of the plurality of teeth.

In yet another aspect, a rotary machine is provided. The rotary machine includes an input rotor, an output rotor, a drive component coupled to the input rotor and configured to induce rotation of the input rotor, and a gear system coupled to the input rotor and the output rotor. The gear system is configured to transmit rotation induced in the input rotor to the output rotor. The gear system includes a central gear, a plurality of planet gears coupled to the central gear, and a ring gear coupled to the plurality of planet gears. The ring gear has a longitudinal axis and includes an annular gear rim that further includes an inner annular surface and a plurality of teeth extending from the inner annular surface. The annular gear rim also includes a plurality of pin members distributed circumferentially about the annular gear rim. The plurality of pin members is configured to couple the annular gear rim to a secondary structure and to facilitate bending of the annular gear rim when a load is applied to a portion of the plurality of teeth.

DRAWINGS

These and other features, aspects, and advantages of the present disclosure will become better understood when the following detailed description is read with reference to the accompanying drawings in which like characters represent like parts throughout the drawings, wherein.

Figure 1:
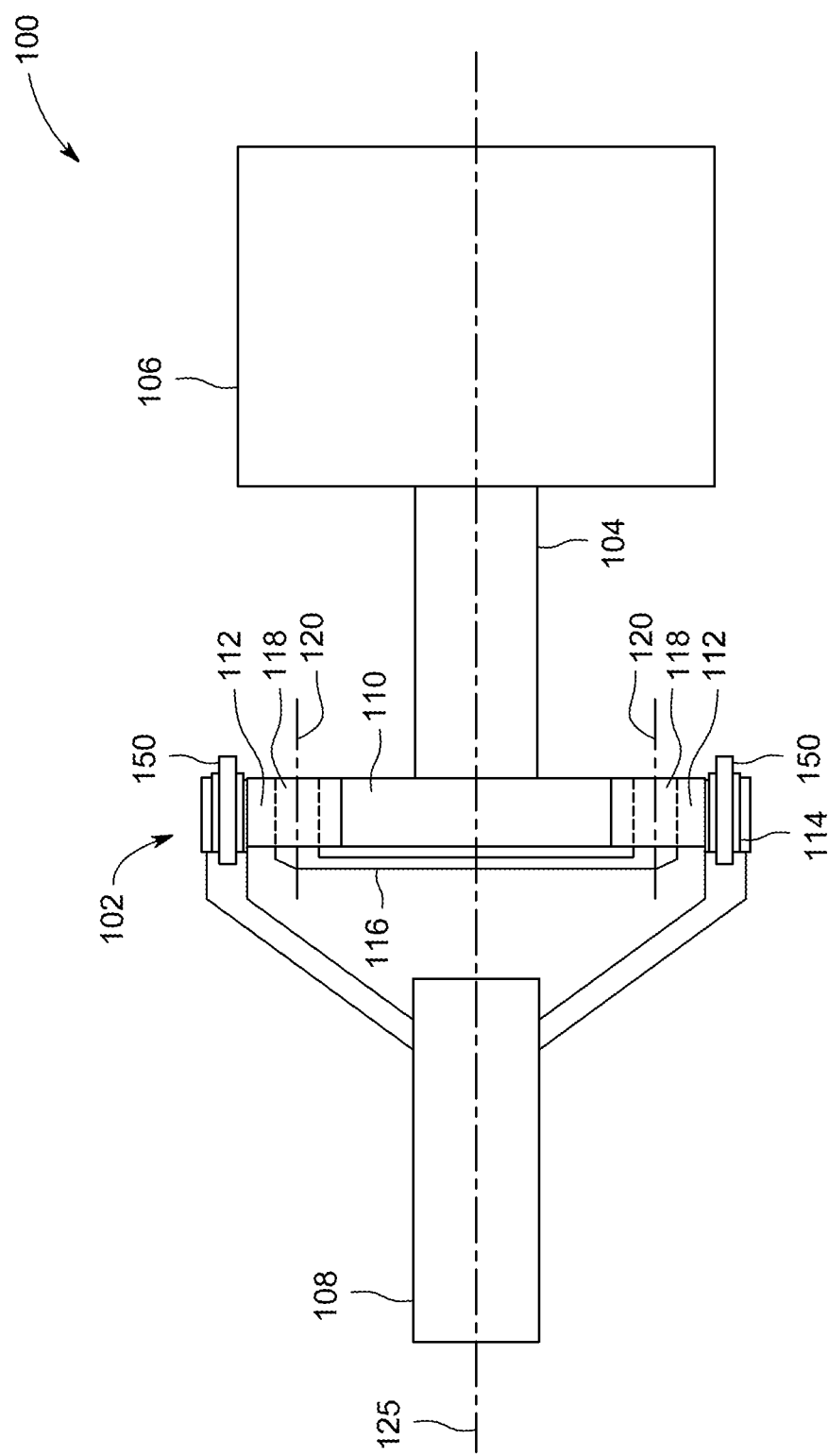
FIG. 1 is a schematic view of an exemplary rotary machine.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Embodiments of ring gears described herein regulate stresses in planetary gear assemblies of rotary machines. Such rotary machines include, without limitation, gas turbine engines, compressors, blowers, pumps, motors, and generators. The ring gear includes a plurality of pin members configured to couple the ring gear to a secondary structure, such as a shaft or housing. The pin members are generally configured to facilitate bending of the annular gear rim during operation of the planetary gear assembly. More specifically, the pin members are configured to couple the ring gear to the secondary structure in a non-rigid manner, thereby facilitating distribution of stresses within the ring gear. In the exemplary embodiment, the pin members are distributed circumferentially about an annular gear rim of the ring gear. Each pin member of the exemplary embodiment includes a plain bearing, such as a bushing, and a pin inserted therein and is configured to traverse the annular gear rim. In alternative embodiments, the plurality of pin members may include roller element bearings or any other suitable type of bearing. For example, in certain embodiments, the annular gear rim may be configured to provide a supply of fluid to the pin member to establish a hydrostatic bearing. In the exemplary embodiment, each pin member is inserted through the annular gear rim, however, in alternative embodiments, each pin member may be configured to be disposed within indentations formed around an outer annular surface of the annular gear rim.

FIG. 1 is a schematic view of an exemplary rotary machine 100. In the exemplary embodiment, rotary machine 100 includes a gear system 102, an input rotor 104, a drive component 106, and an output rotor 108 that are generally arranged along a longitudinal axis 125. Drive component 106 is coupled to input rotor 104 and configured to induce rotation of input rotor 104. Gear system 102 is coupled to input rotor 104 and output rotor 108 such that gear system 102 induces rotation of output rotor 108 when input rotor 104 rotates. In alternative embodiments, rotary machine 100 is any rotary machine. For example, in some embodiments, rotary machine 100 is any of the following, without limitation: a compressor, a blower, a pump, a turbine, a motor, and a generator.

In the exemplary embodiment, gear system 102 includes a sun or central gear 110, planet gears 112, a ring gear 114, a carrier 116, and bearings 118. Planet gears 112 are positioned circumferentially about central gear 110. Each planet gear 112 rotates about an axis 120 and about central gear 110. Accordingly, in the exemplary embodiment, gear system 102 is an epicyclic or planetary gear system. In alternative embodiments, rotary machine 100 includes any gear system 102 that enables rotary machine 100 to operate as described herein.

In addition, in the exemplary embodiment, central gear 110 is coupled to input rotor 104 such that rotation of input rotor 104 induces rotation of central gear 110. Planet gears 112 are engaged with central gear 110 such that rotation of central gear 110 induces rotation of planet gears 112. Ring gear 114 extends about central gear 110 and planet gears 112. Ring gear 114 engages each of planet gears 112. Accordingly, rotation of planet gears 112 induces rotation of ring gear 114. In the exemplary embodiment, ring gear 114 is substantially annular. In alternative embodiments, gear system 102 includes any ring gear 114 that enables gear system 102 to function as described herein. Ring gear 114 is generally coupled to a secondary structure by a plurality of pin members 150. In the exemplary embodiment, ring gear 114 is coupled to output rotor 108 by pin members 150 such that rotation of ring gear 114 induces rotation of output rotor 108. In the exemplary embodiment, pin members 150 are distributed circumferentially about ring gear 114.

Also, in the exemplary embodiment, gear system 102 includes three planet gears 112 spaced equidistant about central gear 110. In alternative embodiments, gear system 102 includes any gears that enable gear system 102 to operate as described herein. For example, in some embodiments, gear system 102 includes four planet gears 112. In further embodiments, gear system 102 includes five or more planet gears 112.

Planet gears 112 are supported by bearings 118, which are coupled to carrier 116. Bearings 118 facilitate each planet gear 112 rotating about axis 120. Moreover, planet gears 112 are coupled to bearings 118 and carrier 116 such that planet gears 112 rotate about central gear 110. In alternative embodiments, rotary machine 100 includes any bearings 118 that enable rotary machine 100 to operate as described herein. For example, in some embodiments, one or more of central gear 110, ring gear 114, input rotor 104, and output rotor 108 are each supported by corresponding bearings.

Also, in the exemplary embodiment, central gear 110 is driven directly by drive component 106 and operates as the input gear of gear system 102. In alternative embodiments, any of central gear 110, planet gears 112, and ring gear 114 is configured to operate as the input gear of gear system 102. More specifically, any one or more of central gear 110, planet gears 112, and ring gear 114 is coupled to a drive mechanism configured to induce rotation of central gear 110, planet gears 112, or ring gear 114, respectively. Similarly, any of central gear 110, planet gears 112, and ring gear 114 which is not configured to operate as the input gear may operate as the output gear of gear system 102. More specifically, any one or more of central gear 110, planet gears 112, and ring gear 114 is coupled to an output shaft or rotor (neither shown) configured to have rotation induced by gear system 102. In certain embodiments, gear system 102 is coupled to or includes a clutch or similar mechanism (neither shown) configured to change which gears of gear system 102 operate as the input gear, which gears operate as the output gear, and which gears are maintained in a fixed position, thereby facilitating multiple gear ratios and modes of operation.

Figure 2:
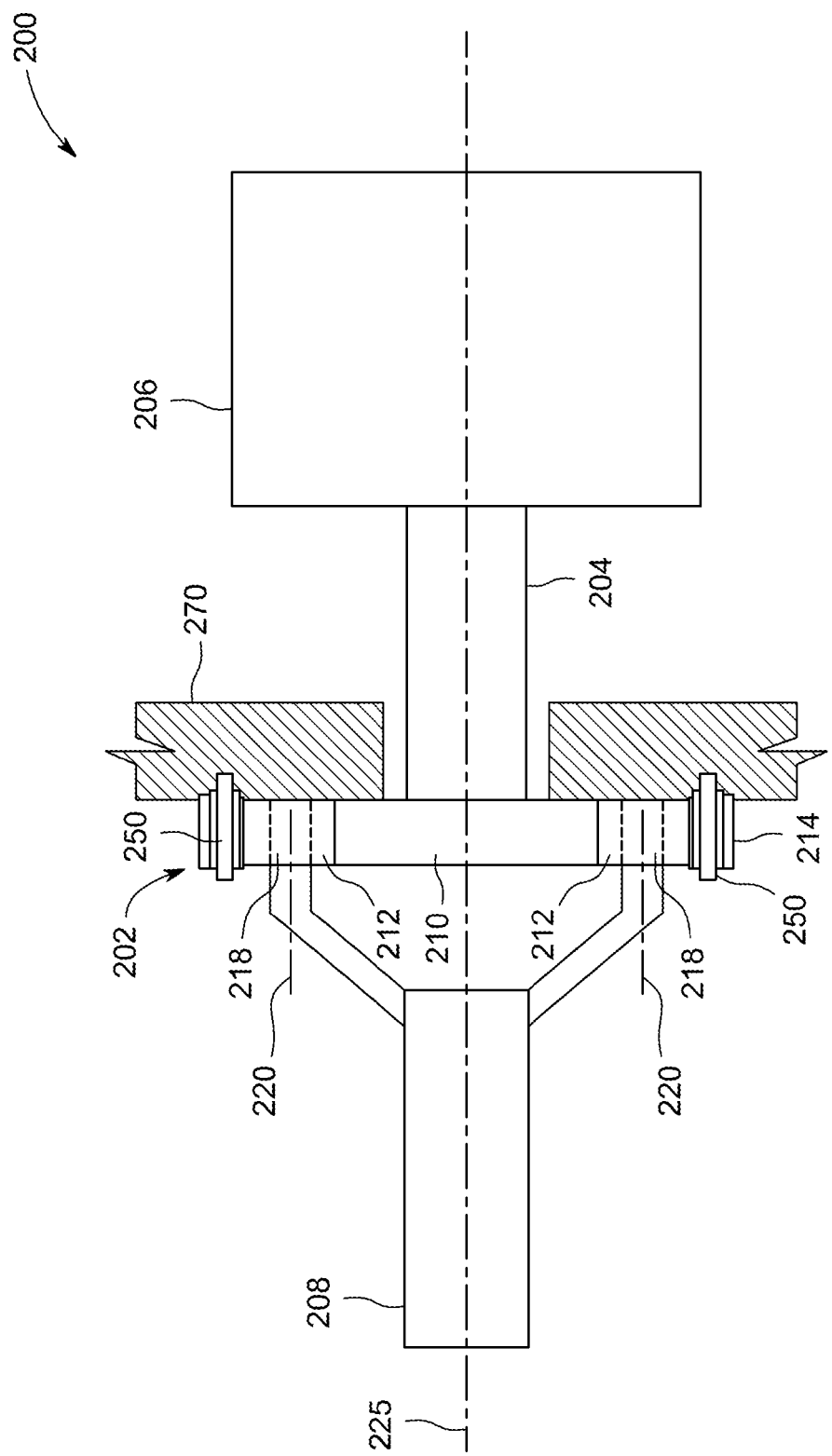
FIG. 2 is a schematic view of an alternative rotary machine.

FIG. 2 is a schematic view of an alternative rotary machine 200. Rotary machine 200 includes a gear system 202, an input rotor 204, a drive component 206, and an output rotor 208. Drive component 206 is coupled to input rotor 204 and configured to induce rotation of input rotor 204. Gear system 202 is coupled to input rotor 204 and output rotor 208 such that gear system 202 induces rotation of output rotor 208 when input rotor 204 rotates.

Gear system 202 includes a sun or central gear 210, planet gears 212, a ring gear 214 and bearings 218. Planet gears 212 are positioned circumferentially about central gear 210. Each planet gear 212 rotates about an axis 220 and about central gear 210. Accordingly, in the second exemplary embodiment, gear system 202 is an epicyclic or planetary gear system.

In addition, central gear 210 is coupled to input rotor 204 such that rotation of input rotor 204 induces rotation of central gear 210. Planet gears 212 are engaged with central gear 210 such that rotation of central gear 210 induces rotation of planet gears 212. Planet gears 212 are coupled to output rotor 208 such that rotation of planet gears 212 induces rotation of output rotor 208. Ring gear 214 extends about central gear 210 and planet gears 212. Ring gear 214 engages each of planet gears 212 and is generally coupled to a secondary structure by a plurality of pin members 250. In the second exemplary embodiment, the secondary structure is a gear assembly housing 270 and coupling of ring gear 214 to gear assembly housing 270 using pin members 250 maintains ring gear 214 in a fixed position during rotation of central gear 210 and planet gears 212.

In alternative embodiments, planet gears 212 are configured to operate as the input gear of gear system 202. More specifically, planet gears 212 are coupled via carrier 216 to a drive mechanism configured to induce rotation of carrier 216 and planet gears 212. In such configurations, central gear 210 operates as the output gear of gear system 202. In certain embodiments, gear system 202 is coupled to or includes a clutch or similar mechanism (neither shown) configured to change which gears of gear system 202 operate as the input gear, which gears operate as the output gear, and which gears are maintained in a fixed position, thereby facilitating multiple gear ratios and modes of operation.

Figure 3:
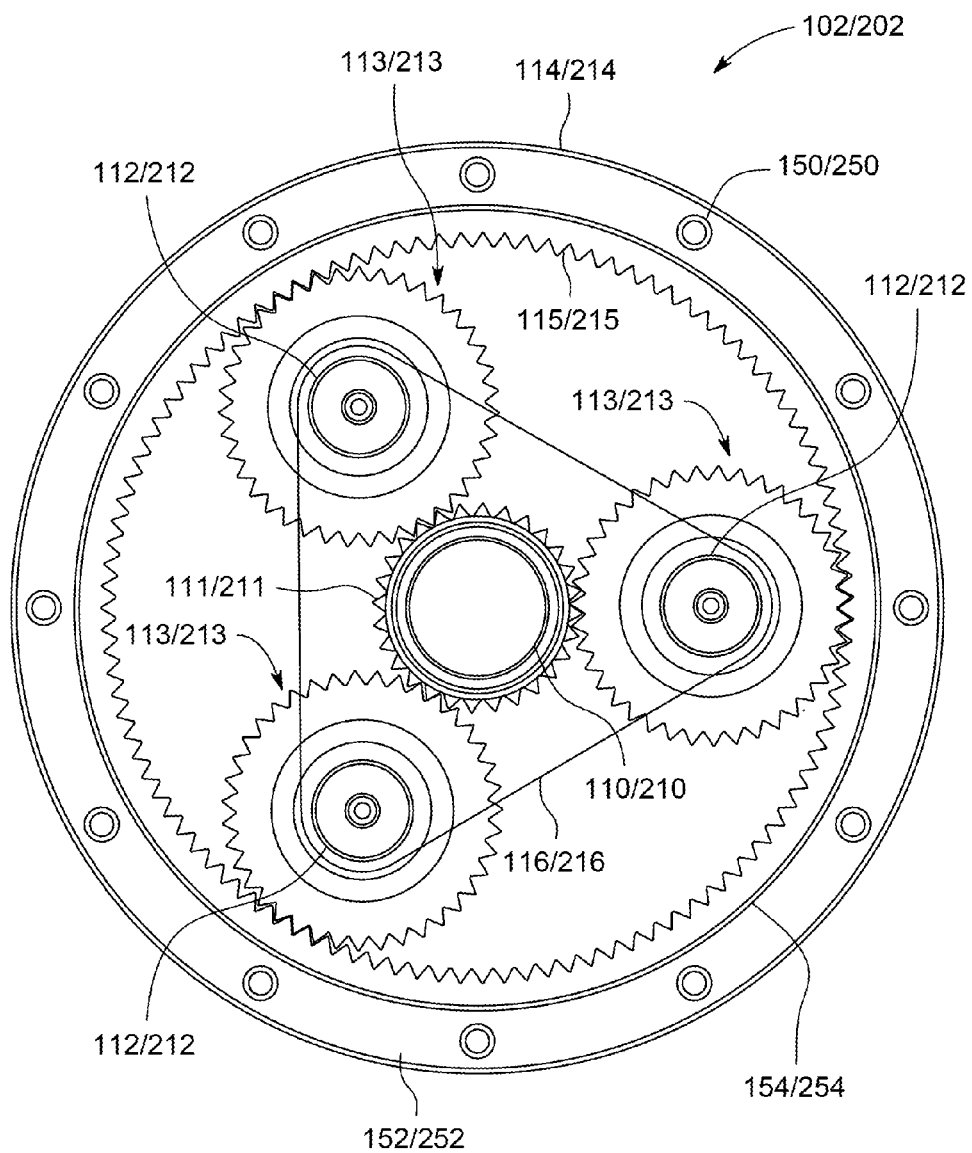
FIG. 3 is a schematic diagram of a gear system of the exemplary rotary machine of FIG. 1 and of the alternative rotary machine of FIG. 2.

FIG. 3 is a schematic diagram of gear system 102 of rotary machine 100 (shown in FIG. 1) and gear system 202 of rotary machine 200 (shown in FIG. 2). Referring first to gear system 102 of rotary machine 100, gear system 102 is a planetary gear system. Gear system 102 includes central gear 110, a plurality of planet gears 112, a ring gear 114, and a carrier 116. In some embodiments, input rotor 104 (shown in FIG. 1) is fixedly coupled to central gear 110. Central gear 110 includes a plurality of radially extending central gear teeth 111 disposed about the circumference of central gear 110. Each of planet gears 112 similarly include a plurality of radially extending planet gear teeth 113 disposed about their circumference and configured to be complementary to and to engage central gear teeth 111. Planet gears 112 are maintained in a position relative to each other using carrier 116. Ring gear 114 includes an annular gear rim 152. Annular gear rim includes an inner annular surface 154 and a plurality of ring gear teeth 115 extending therefrom. Ring gear teeth 115 are configured to be complementary to and to engage planet gear teeth 113. Ring gear 114 further includes a plurality of pin members 150 distributed circumferentially about annular gear rim 152. Ring gear 114, for example, includes twelve pin members 150 distributed circumferentially about annular gear rim 152. In other embodiments, ring gear 114 may include any number of pin members 150 and preferably between and inclusive of ten pin members and twenty pin members.

Referring next to gear system 202 of rotary machine 200, gear system 202 is a planetary gear system. Gear system 202 includes central gear 210, a plurality of planet gears 212, a ring gear 214, and a carrier 216. In some embodiments, input rotor 204 (shown in FIG. 2) is fixedly coupled to central gear 210. Central gear 210 includes a plurality of radially extending central gear teeth 211 disposed about the circumference of central gear 210. Each of planet gears 212 similarly include a plurality of radially extending planet gear teeth 213 disposed about their circumference and configured to be complementary to and to engage central gear teeth 211. Planet gears 212 are maintained in a position relative to each other using carrier 216. Ring gear 214 includes an annular gear rim 252. Annular gear rim includes an inner annular surface 254 and a plurality of ring gear teeth 215 extending therefrom. Ring gear teeth 215 are configured to be complementary to and to engage planet gear teeth 213. Ring gear 214 further includes a plurality of pin members 250 distributed circumferentially about annular gear rim 252. Ring gear 214, for example, includes twelve pin members 250 distributed circumferentially about annular gear rim 252. In other embodiments, ring gear 214 may include any number of pin members 250 and preferably between and inclusive of ten pin members and twenty pin members.

Figure 4:
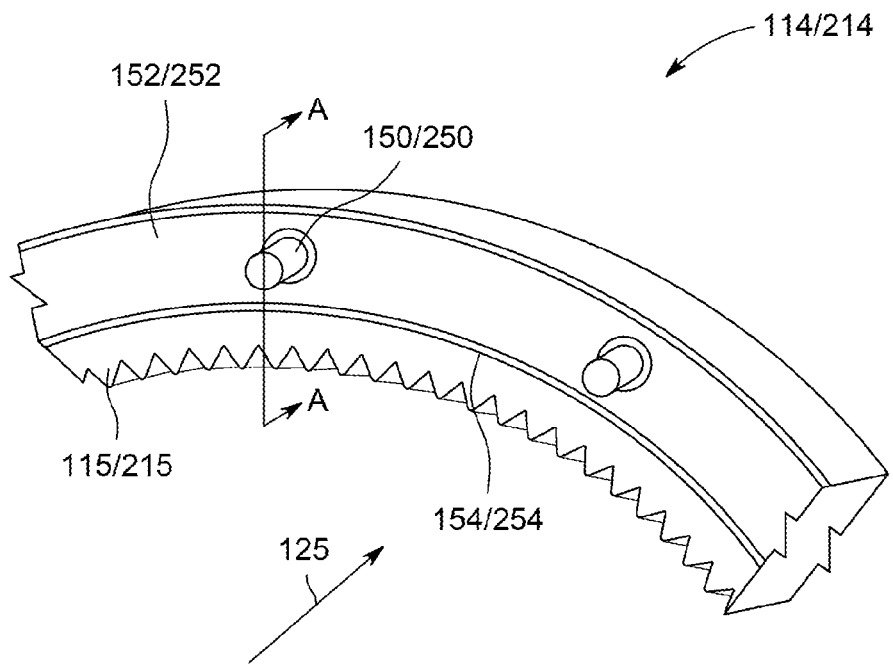
FIG. 4 is a partial isometric view of a ring gear of the gear system of FIG. 3.
Figure 5:
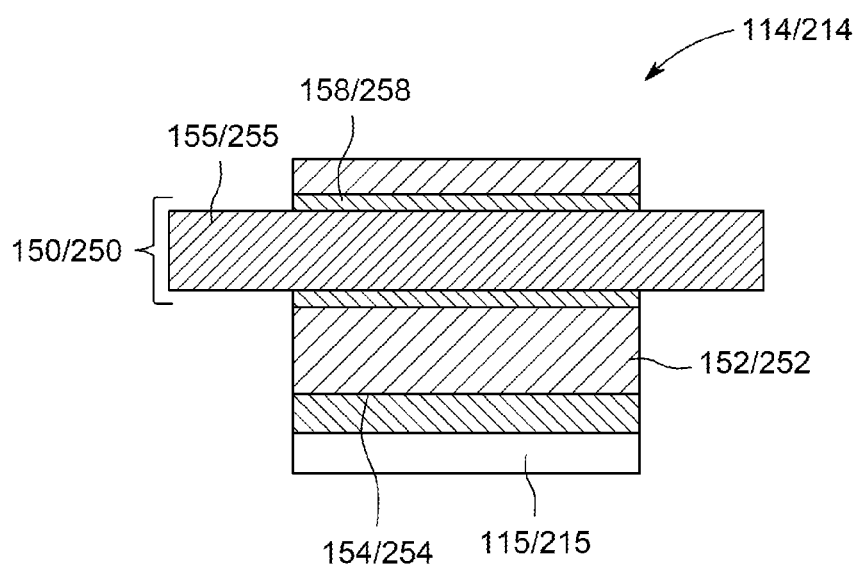
FIG. 5 is a partial cross-sectional view of the ring gear of FIG. 4 taken along line A-A shown in FIG. 4.

FIG. 4 is a partial isometric view of ring gear 114/214 of gear system 102/202 (shown in FIG. 3). FIG. 5 is a partial cross-sectional view of ring gear 114/214 taken along line A-A as shown in FIG. 4. Ring gear 114/214 includes pin members 150/250, which are distributed circumferentially about annular gear rim 152/252. Pin members 150/250, are oriented parallel to longitudinal axis 125/225 and traverse annular gear rim 152/252. For example, pin members 150/250 of ring gear 114/214 extend through gear rim 152/252. Annular gear rim 152/252 includes inner annular surface 154/254 from which ring gear teeth 115/215 extend. As shown in FIG. 5, pin members 150/250 are inserted into annular gear rim 152/252. Pin members 150/250 include bearings, such as plain bearing 158/258, and a pins, such as pin 155, extending therethrough. Pin 155/255 extends beyond annular gear rim 152/252 to facilitate coupling of annular gear rim 152/252 to a secondary structure, such as output rotor 108/208 (shown in FIGS. 1 and 2).

Figure 6:
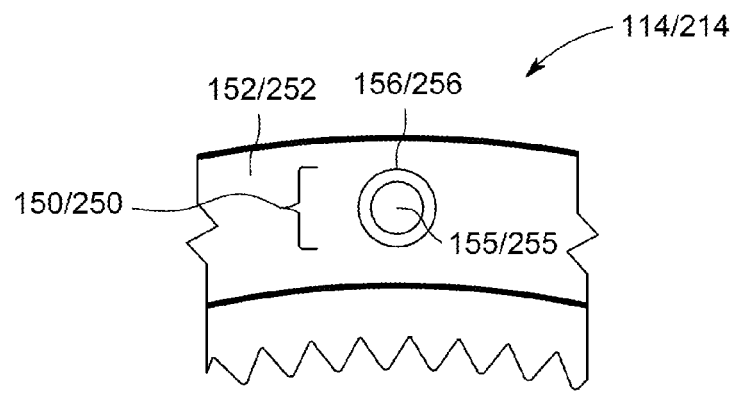
FIG. 6 is a schematic view of a portion of the ring gear of FIG. 4.
Figure 7:
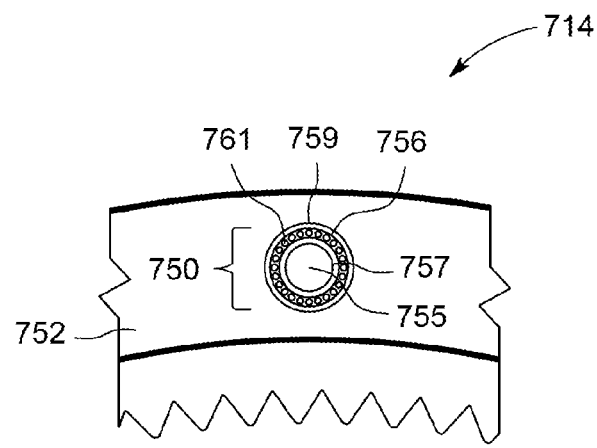
FIG. 7 is a schematic view of a portion of an alternative ring gear that may be used with the gear system of FIG. 3.
Figure 8:
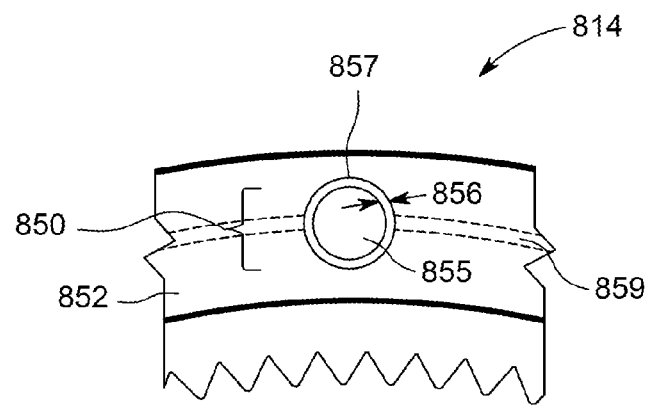
FIG. 8 is a schematic view of a portion of another alternative ring gear that may be used with the gear system of FIG. 3.

FIG. 6 is a schematic view of a portion of ring gear 114/214 (shown in FIG. 3). FIG. 7 is a schematic view of a portion of an alternative ring gear 714 that may be used with gear system 102/202 (shown in FIG. 3). FIG. 8 is a schematic view of a portion of another alternative ring gear 814 that may be used with gear system 102/202.

FIGS. 6-8 show configurations of pin members according to different embodiments. Specifically, ring gear 114/214 of FIG. 6 shows pin members 150 and 250 for use in ring gear 114 of exemplary rotary machine 100 and ring gear 214 of alternative rotary machine 200, respectively. FIGS. 7 and 8 show pin members 750 and 850 for use in alternative ring gears 714 and 814, respectively.

Referring first to FIG. 6, ring gear 114/214 includes pin member 150/250. Pin member 150/250 further includes plain bearing 158/258 and pin 155/255 which is inserted through plain bearing 158/258.

Referring next to FIG. 7, ring gear 714 includes an annular gear rim 752 and pin member 750 that further includes a bearing 756 and a pin 755 extending therethrough. Bearing 756 is a roller element bearing including an inner raceway 757, an outer raceway 759, and a plurality of roller elements 761 disposed between inner raceway 757 and outer raceway 759. In the embodiment of FIG. 7, outer raceway 759 is shown as a ring or similar cylindrical structure inserted into annular gear rim 752. In other embodiments, annular gear rim 752 forms outer raceway 759. Roller elements 761 may include, but are not limited to balls, cylindrical rollers, spherical rollers, and tapered rollers.

Referring to FIG. 8, ring gear 814 includes an annular gear rim 852 and pin member 850 that further includes a pin 855. Annular gear rim 852 includes a bore 857 into which pin member 850 is inserted. Annular gear rim 852 further defines fluid pathways 859 through which fluid may be provided during operation. Bore 857 and pin member 850 define a gap 856 in fluid communication with fluid pathways 859 such that during operation fluid may be provided into gap 856. Such fluid may thereby form a hydrostatic bearing between bore 857 and pin 855.

In certain embodiments, ring gears in accordance with this disclosure include fluid pathways, such as fluid pathways 859 of FIG. 8, and use such fluid pathways to provide lubrication to pin members and, more specifically, bearings of such pin members. For example, in certain embodiments a plain bearing, such as plain bearing 158 (shown in FIG. 6), is configured to be in fluid communication with fluid pathways defined in an annular gear rim, such as annular gear rim 152, such that the plain bearing is lubricated by providing a stream of lubricant to the fluid pathways.

Figure 9:
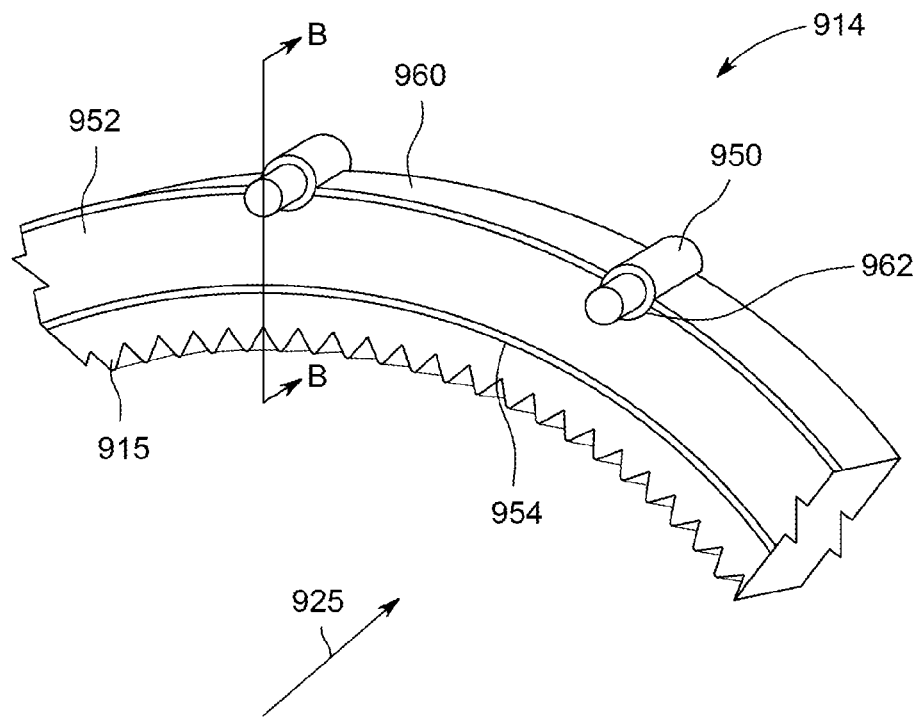
FIG. 9 is a partial isometric view of yet another alternative ring gear that may be used with the gear system of FIG. 3.
Figure 10:
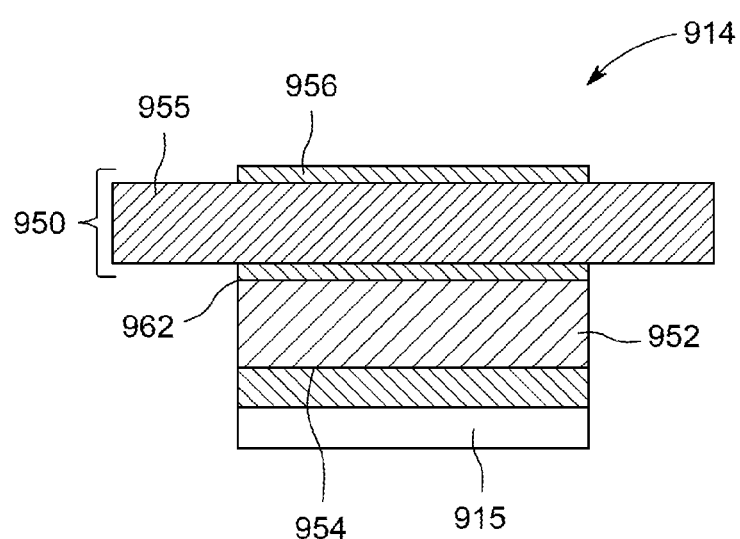
FIG. 10 is a partial cross-sectional view of the ring gear of FIG. 9 taken along line B-B shown in FIG. 9.

FIG. 9 is a partial isometric view of yet another alternative ring gear 914 that may be used with gear system 102/202 (shown in FIG. 3). FIG. 10 is a partial cross-sectional view of ring gear 914 taken along line B-B as shown in FIG. 9. Ring gear 914 includes an inner annular surface 954 from which a plurality of ring gear teeth 915 extends. Ring gear 914 further includes an outer annular surface 960 opposite inner annular surface 954. Outer annular surface 960 defines a plurality of circumferentially distributed indentations 962. Each indentation 962 is configured to at least partially receive one of a plurality of pin members 950 such that pin members 950 are similarly circumferentially distributed about annular gear rim 952. As shown in FIG. 10, pin member 950 is at least partially disposed within indentation 962. Pin member 950 traverses annular gear rim 952 and includes a bearing, more specifically a plain bearing 956, and a pin 955 extending therethrough.

Figure 11:
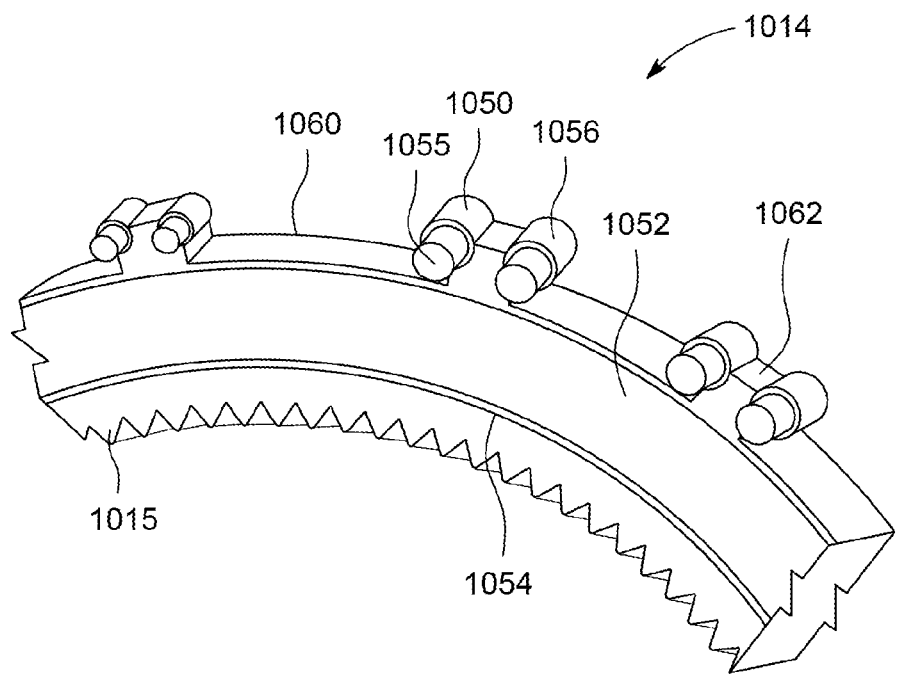
FIG. 11 is a partial isometric view of yet another alternative ring gear that may be used with the gear system of FIG. 3.
Figure 12:
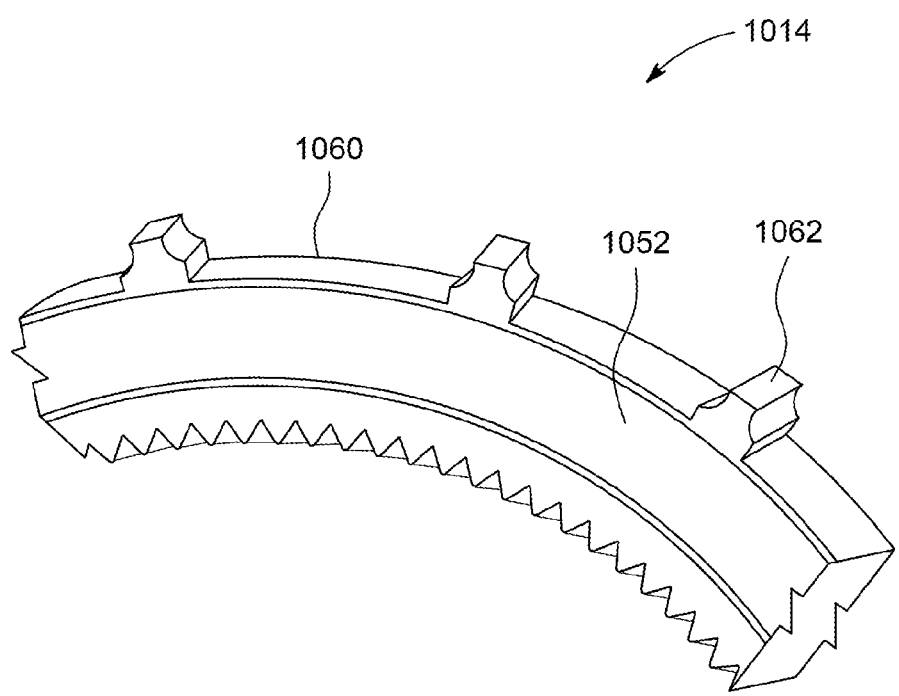
FIG. 12 is an alternative isometric view of the ring gear of FIG. 11 with pin members removed.

FIGS. 11 and 12 are partial isometric views of yet another alternative ring gear 1014 that may be used with gear system 102/202 (shown in FIG. 3). Ring gear 1014 includes an inner annular surface 1054 from which a plurality of ring gear teeth 1015 extends. Ring gear 1014 further includes an outer annular surface 1060 opposite inner annular surface 1054. Outer annular surface 1060 includes a plurality of circumferentially distributed splines or protrusions 1062. Each spline 1062 is configured to at least partially receive a portion of the plurality of pin members 1050 such that pin members 1050 are circumferentially distributed about annular gear rim 1052. In the embodiment of FIGS. 11 and 12, each spline 1062 is configured to receive two pin members 1050 of the plurality of pin members. In alternative embodiments, splines may be configured to receive any of one or more pin members. FIG. 12 is a partial isometric view of alternative ring gear 1014 with pin members 1050 removed to more clearly show splines 1062 extending from outer annular surface 1060 of annular gear rim 1052.

Pin members 1050 traverse annular gear rim 1052 and include a bearing, more specifically a plain bearing 1056, and a pin 1055 extending therethrough. In alternative embodiments, pin members 1050 may include only a pin. In certain embodiments, alternative ring gear 1014 is configured such that when unloaded, a clearance (not shown) is present between a corresponding spline and one or more pin members supported by the spline. During operation of such embodiments, bending of alternative ring gear 1014 causes one or more of the pin members to contact the corresponding spline and to transfer a load thereto.

Figure 13:
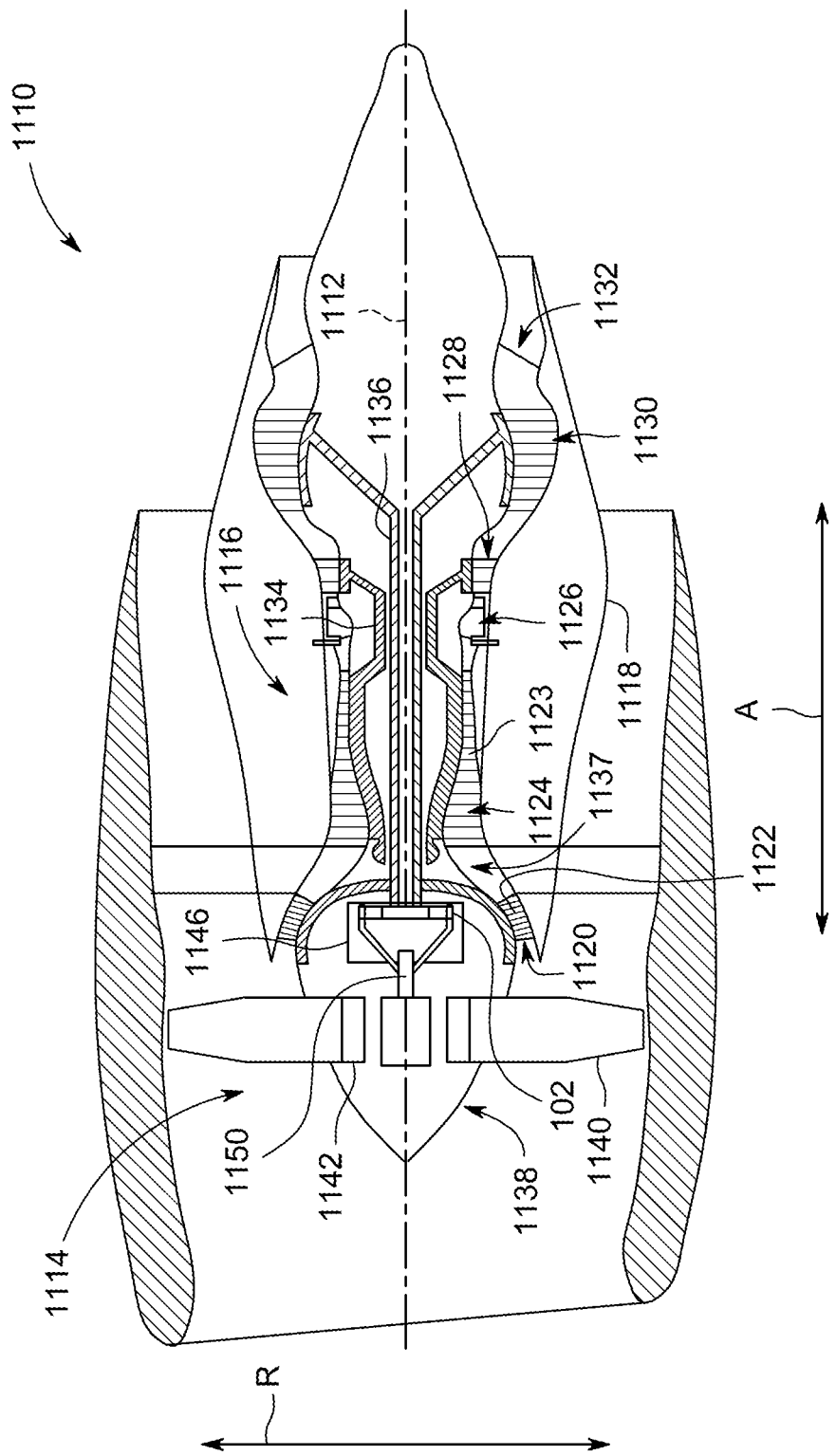
FIG. 13 is a schematic illustration of an exemplary gas turbine engine including the gear system of FIG. 3.

FIG. 13 is a schematic illustration of an exemplary gas turbine engine 1110 including exemplary gear system 102. In the exemplary embodiment, gas turbine engine 1110 is a high-bypass turbofan jet engine 1110, referred to herein as "turbofan engine 1110." As shown in FIG. 12, turbofan engine 1110 defines an axial direction A (extending parallel to a longitudinal centerline 1112 provided for reference) and a radial direction R. In general, turbofan engine 1110 includes a fan section 1114 and a core turbine engine 1116 disposed downstream from fan section 1114.

Exemplary core turbine engine 1116 generally includes a substantially tubular outer casing 1118 that defines an annular inlet 1120. Outer casing 1118 encases, in serial flow relationship, a compressor section 1123 including a booster or low pressure (LP) compressor 1122 and a high pressure (HP) compressor 1124; a combustion section 1126; a turbine section including a high pressure (HP) turbine 1128 and a low pressure (LP) turbine 1130; and a jet exhaust nozzle section 1132. A high pressure (HP) shaft or spool 1134 drivingly connects HP turbine 1128 to HP compressor 1124. A low pressure (LP) shaft or spool 1136 drivingly connects LP turbine 1130 to LP compressor 1122. The compressor section 1123, combustion section 1126, turbine section, and nozzle section 1132 together define a core air flowpath 1137.

For the embodiment shown, fan section 1114 includes a fan 1138 having a plurality of fan blades 1140 coupled to a disk 1142 in a spaced apart manner. As shown, fan blades 1140 extend outwardly from disk 1142 generally along radial direction R. Fan blades 1140 and disk 1142 are together rotatable about longitudinal axis 1112 by LP shaft 1136 across a power gear box 1146. Power gear box 1146 includes gear system 102 for adjusting the rotational speed of fan 1138 relative to LP shaft 1136 to a more efficient rotational fan speed. More specifically, gear system 102 couples LP shaft 1136 to disk 1142 via fan rotor 1150 of fan section 1114. During operation, gear system 102 is driven by LP shaft 1136 and provides an output rotation to fan rotor 1150, thereby rotating fan section 1114.

The above-described ring gear provides an efficient method for regulating root bending stresses in planetary gear assemblies of rotary machines. Specifically, pin members of the ring gear are configured to couple the ring gear to secondary structures in a manner that facilitates bending of the ring gear around the pin members during operation. By doing so, stresses induced during operation are distributed through the ring gear and high localized stresses, particularly in the root of the ring gear, are reduced.

An exemplary technical effect of the methods and apparatus described herein includes at least one of: (a) decreasing localized root bending stresses and strain induced in ring gears during operation; (b) improving rotary machine performance and efficiency by facilitating the use of thinner and/or lighter ring gears; (c) increasing the reliability and lifespan of ring gears by reducing peak stresses and strain during operation; (d) decreasing the overall weight of rotary machines including ring gears; and (e) improving load sharing among planet gears by distributing localized loading effects caused by manufacturing, assembly, and other errors.

Exemplary embodiments of the ring gear are described above in detail. The ring gear, and methods of operating such units and devices are not limited to the specific embodiments described herein, but rather, components of systems and/or steps of the methods may be utilized independently and separately from other components and/or steps described herein. For example, the methods may also be used in combination with other systems for regulating stresses in planetary gear assemblies of rotary machines, and are not limited to practice with only the systems and methods as described herein. Rather, the exemplary embodiment may be implemented and utilized in connection with many other machinery applications that require planetary gear assemblies.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A ring gear having a longitudinal axis, said ring gear comprising:
   an annular gear rim comprising:
      an inner annular surface; and
      a plurality of teeth extending from said inner annular surface, said plurality of teeth configured to mate with a planet gear of a planetary gear assembly; and
   a plurality of pin members distributed circumferentially about said annular gear rim, each pin member of said plurality of pin members oriented parallel to the longitudinal axis, wherein said plurality of pin members is configured to couple said annular gear rim to a secondary structure and to facilitate bending of said annular gear rim when said annular gear rim is coupled to the secondary structure and a load is applied to at least a portion of said plurality of teeth by the planet gear;
   wherein said annular gear rim comprises an outer annular surface opposite said inner annular surface, said outer annular surface including a plurality of splines extending therefrom, and wherein said each pin member is at least partially supported by a respective spline of said plurality of splines.

2. The ring gear in accordance with claim 1, wherein the secondary structure is one of a rotor and a gearbox housing.

3. The ring gear in accordance with claim 1, wherein said each pin member is configured to be lubricated.

4. The ring gear in accordance with claim 1, wherein said each pin member comprises a pin and a bearing.

5. The ring gear in accordance with claim 4, wherein said bearing is one of a plain bearing, a rolling-element bearing, and a hydrostatic bearing.

6. The ring gear in accordance with claim 1, wherein said plurality of pin members extends through said annular gear rim.

7. The ring gear in accordance with claim 1, wherein said annular gear rim comprises an outer annular surface opposite said inner annular surface, said outer annular surface defining a plurality of indentations, and wherein said each pin member is at least partially disposed within a respective indentation of said plurality of indentations.

8. A gear assembly comprising:
   a central gear;
   a plurality of planet gears coupled to said central gear; and
   a ring gear coupled to said plurality of planet gears, said ring gear having a longitudinal axis, said ring gear comprising:
      an annular gear rim comprising:
         an inner annular surface; and
         a plurality of teeth extending from said inner annular surface; and
      a plurality of pin members distributed circumferentially about said annular gear rim, wherein said plurality of pin members is configured to couple said annular gear rim to a secondary structure and to facilitate bending of said annular gear rim when said annular gear rim is coupled to the secondary structure and a load is applied to at least a portion of said plurality of teeth;
      wherein said annular gear rim comprises an outer annular surface opposite said inner annular surface, said outer annular surface including a plurality of splines extending therefrom, and wherein said each pin member is at least partially supported by a respective spline of said plurality of splines.

9. The gear assembly in accordance with claim 8, wherein said each pin member is configured to be lubricated.

10. The gear assembly in accordance with claim 8, wherein said each pin member comprises a pin and a bearing.

11. The gear assembly in accordance with claim 10, wherein said bearing is one of a plain bearing, a rolling-element bearing, and a hydrostatic bearing.

12. The gear assembly in accordance with claim 8, wherein said plurality of pin members extends through said annular gear rim.

13. The gear assembly in accordance with claim 8, wherein said annular gear rim comprises an outer annular surface opposite said inner annular surface, said outer annular surface defining a plurality of indentations, and wherein each pin member of said plurality of pin members is at least partially disposed within a respective indentation of said plurality of indentations.

14. A rotary machine comprising an input rotor, an output rotor, a drive component coupled to said input rotor and configured to induce rotation of said input rotor, and a gear system coupled to said input rotor and said output rotor, said gear system configured to transmit rotation induced in said input rotor to said output rotor, said gear system comprising:
   a central gear;
   a plurality of planet gears coupled to said central gear; and
   a ring gear coupled to said plurality of planet gears, said ring gear having a longitudinal axis, said ring gear comprising:
      an annular gear rim comprising:
         an inner annular surface; and
         a plurality of teeth extending from said inner annular surface; and
      a plurality of pin members distributed circumferentially about said annular gear rim, wherein said plurality of pin members is configured to couple said annular gear rim to a secondary structure and to facilitate bending of said annular gear rim when a load is applied to at least a portion of said plurality of teeth;
      wherein said annular gear rim comprises an outer annular surface opposite said inner annular surface, said outer annular surface including a plurality of splines extending therefrom, and wherein said each pin member is at least partially supported by a respective spline of said plurality of splines.

15. The rotary machine in accordance with claim 14, wherein said each pin member includes a pin and a bearing.

16. The rotary machine in accordance with claim 15, wherein the bearing is one of a plain bearing, a rolling-element bearing, and a hydrostatic bearing.

17. The rotary machine in accordance with claim 14, wherein the annular gear rim includes an outer annular surface opposite the inner annular surface, the outer annular surface defining a plurality of indentations, and wherein each pin member of the plurality of pin members is at least partially disposed within a respective indentation of the plurality of indentations.

\* \* \* \* \*